US005650240A

United States Patent [19]
Rogers

[11] Patent Number: 5,650,240
[45] Date of Patent: Jul. 22, 1997

[54] MULTICELL BATTERY SYSTEM WITH INDIVIDUALLY CONTROLLABLE CELL BYPASSES

[75] Inventor: Howard H. Rogers, Torrance, Calif.

[73] Assignee: Hughes Aircraft Company, Los Angeles, Calif.

[21] Appl. No.: 517,309

[22] Filed: Aug. 21, 1995

[51] Int. Cl.$^6$ ................................................. H01M 2/34
[52] U.S. Cl. ............................ 429/61; 429/90; 337/15
[58] Field of Search ........................ 429/61, 90; 337/15; 320/15, 17

[56] References Cited

U.S. PATENT DOCUMENTS

| | | | |
|---|---|---|---|
| 5,180,641 | 1/1993 | Burns et al. | 429/61 X |
| 5,258,244 | 11/1993 | Hall et al. | 429/61 |
| 5,549,984 | 8/1996 | Dougherty | 429/61 |

Primary Examiner—John S. Maples
Attorney, Agent, or Firm—Elizabeth E. Leitereg; Terje Gudmestad; Wanda K. Denson-Low

[57] ABSTRACT

A multicell battery system includes at least two battery cells, and a selective cell bypass for each of the battery cells. Each cell bypass includes a metal-oxide-semiconductor field effect transistor (MOSFET) having a source, a drain, and a gate, a first electrical interconnection from the MOSFET source to a first side of the battery cell, a second electrical interconnection from the MOSFET drain to a second side of the battery cell, and an activation circuit connected to the MOSFET gate. The activation circuit includes an AND gate having as one input an AC square wave signal and as a second input a selection signal, a capacitor connected to the AND gate output signal, and a cascade voltage doubling circuit having an input in communication with a second electrode of the capacitor and an output in communication with the MOSFET gate.

11 Claims, 2 Drawing Sheets

5,650,240

MULTICELL BATTERY SYSTEM WITH INDIVIDUALLY CONTROLLABLE CELL BYPASSES

BACKGROUND OF THE INVENTION

This invention relates to a multicell battery such as used in a spacecraft power system, and, more particularly, to a controllable cell bypass system for such a battery.

A battery is formed of individual cells, each of which produces a voltage and current output. The cells are arranged in series or parallel arrays to form the battery, according to the required voltage and current output of the battery. In one practical application, the battery is used to store and provide power for a spacecraft in orbit, such as a communications satellite. Each such battery typically includes multiple cells, often as many as 20 or more cells.

The design of the battery power system of a communications satellite presents special challenges. The battery power system must continue to operate in an acceptable manner for years while physically inaccessible because the satellite is in high-earth orbit. In such multicell batteries, a bypass circuit for each of the cells is usually provided. Otherwise, if one of the cells were to fail to an open circuit condition, the battery would be rendered inoperable in the open-circuit state. The bypass circuit permits the failed cell to be bypassed, so that the battery continues to function but at a diminished performance level. It is common practice to overdesign the battery according to the statistical probabilities of failure of one or more cells in the battery, so that, through the use of the bypass circuitry, the battery can continue to function in an acceptable manner.

A number of bypass circuit designs have been utilized. For example, in one approach an individual relay is placed into each cell bypass circuit. Relays are heavy and can suffer damage during launch.

Accordingly there is a need for an improved cell bypass technique for use in spacecraft and other multicell batteries. The present invention fulfills this need, and further provides related advantages.

SUMMARY OF THE INVENTION

The present invention provides a multicell battery system with individually controllable cell bypasses. The cell bypass circuitry is rugged, light weight, and compact. The need for multiple isolated power supplies is avoided by the circuit design.

In accordance with the invention, a multicell battery system with individually controllable cell bypasses comprises at least two battery cells, a single AC low power source having an AC output, preferably a square wave, and means for selectively accomplishing a cell bypass of each of the battery cells. The means for accomplishing comprises means for selectively bypassing a single battery cell, which includes a metal-oxide-semiconductor field effect transistor (MOSFET) having a source, a drain, and a gate, a first electrical interconnection from the MOSFET source to a first side of the battery cell, and a second electrical interconnection from the MOSFET drain to a second side of the battery cell. There is, additionally, means for selectively activating the MOSFET gate using the AC output and for maintaining the MOSFET gate active. In the preferred approach, the means for selectively activating includes an AND gate having as one input the AC output, and as a second input a selection signal, and further having as an AND gate output a control signal in communication with the MOSFET gate. There is a capacitor between the AND gate and the MOSFET gate, and a cascade voltage doubling circuit between the capacitor and the MOSFET gate. Most preferably, there is such a means for selectively bypassing a single battery cell for each of the battery cells.

In a most preferred approach, a multicell battery system with individually controllable cell bypasses comprises a plurality of battery cells, a single AC power source having an AC output signal, preferably a square wave, and a selective cell bypass of each of the battery cells. Each cell bypass comprises a MOSFET having a source, a drain, and a gate, a first electrical interconnection from the MOSFET source to a first side of the battery cell, a second electrical interconnection from the MOSFET drain to a second side of the battery cell, and an activation circuit connected to the MOSFET gate. The activation circuit comprises an AND gate having as one input the AC output signal, and as a second input a selection signal, and having an AND gate output signal. A capacitor has a first electrode in communication with the AND gate output signal and a second electrode, and a cascade voltage doubling circuit has an input in communication with the second electrode of the capacitor and an output in communication with the MOSFET gate. The cascade voltage doubling circuit preferably comprises a first leg comprising a first diode having a first diode anode in communication with the input and a first diode cathode in communication with the MOSFET gate, and a second leg. The second leg has a second diode having a second diode cathode in communication with the input and a second diode anode in communication with the MOSFET source, and a resistor having a first resistor end in communication with the second diode anode and a second resistor end in communication with the MOSFET gate.

The present approach is based upon the activation of a MOSFET using a high-frequency AC driving circuit. A single AC power source drives a plurality of bypass switches and bypass circuits. Each individual bypass circuit weighs on the order of a few grams and is highly resistant to damage from vibration or the like. Thus, the present approach is lightweight and rugged. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
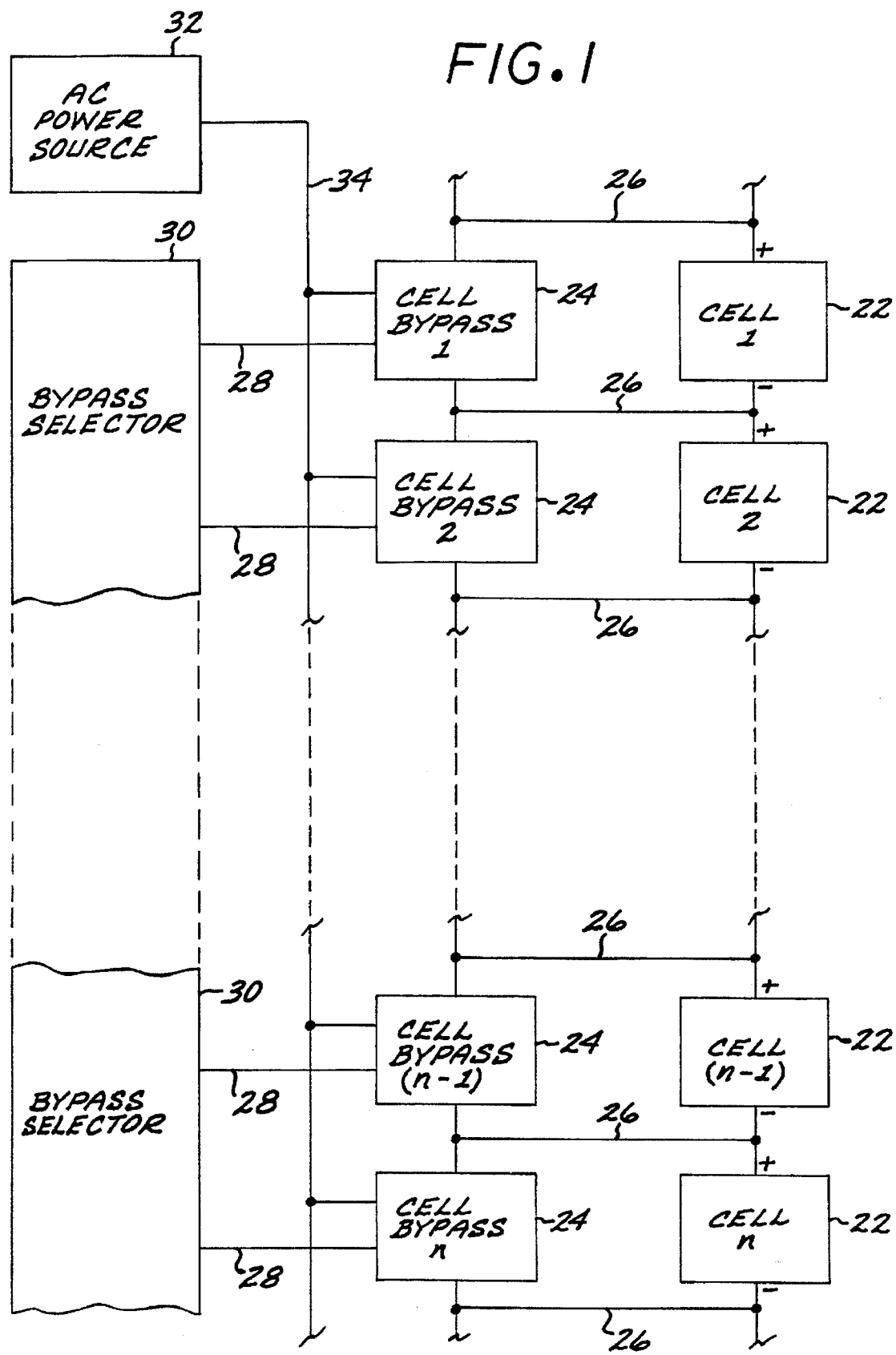
FIG. 1 is a schematic circuit diagram of a multicell battery system.

FIG. 1 depicts a multicell battery system 20 including at least two, and here illustrated as a plurality n of, electrochemical cells 22. In a typical spacecraft battery system used in a geosynchronous communications satellite, n is typically on the order of about 30. The cells 22 are illustrated as arranged in series as is normally the case, but other arrangements can be used as well. For each of the cells 22, there is a cell bypass circuit 24. Each of the cell bypass circuits 24 connects between the opposite polarities (+ and −) of its respective cell 22 through an electrical bypass interconnection 26. Each bypass circuit 24 is normally open, so that there is no bypass around its respective cell 22. Upon activation of the bypass circuit 24, the interconnection 26 is closed through the bypass circuit 24, and a bypass is created around the respective cell 22 (but only that cell) through the bypass circuit 24 and the interconnection 26. In that case, the battery system 20 continues to function, with a battery system voltage dished by the voltage of the bypassed cell.

A selection signal 28 is provided to a selected cell bypass circuit 24 by a bypass selector 30. Each of the selection signals 28 is independent of the others. The bypass selector 30 can be any operable type. For many satellites, the bypass selector 30 is a manual uplink telemetry signal from a ground control station, where the status of the cells 22 as measured by onboard sensors is monitored by downlink telemetry. If the satellite controller judges that a cell is about to fail in an open-circuit condition, the bypass circuit 24 for the cell is manually selected. Equivalently for the present purposes, the bypass selector 30 can include an automatic selection based upon onboard analysis of the status of the cell. A combination of the two approaches can also be used.

The cell bypass circuit 24 requires power to operate when selected. In the present approach, that power is provided by an AC (alternating current) low power source 32 having an AC output signal 34 connected to each of the cell bypass circuits 24. The AC output signal 34 is preferably a square wave signal of about 10 kilohertz frequency, but it can be of a different waveform and of a different frequency. The use of a single AC power source 32 is an important advantage of the present invention. Only one low-power source is needed, and it is AC rather than DC (direct current). Thus, there is reduced weight as compared with a requirement for multiple power sources, and reduced dependence upon maintaining a specific DC voltage level, as compared with the use of multiple DC power sources.

Figure 2:
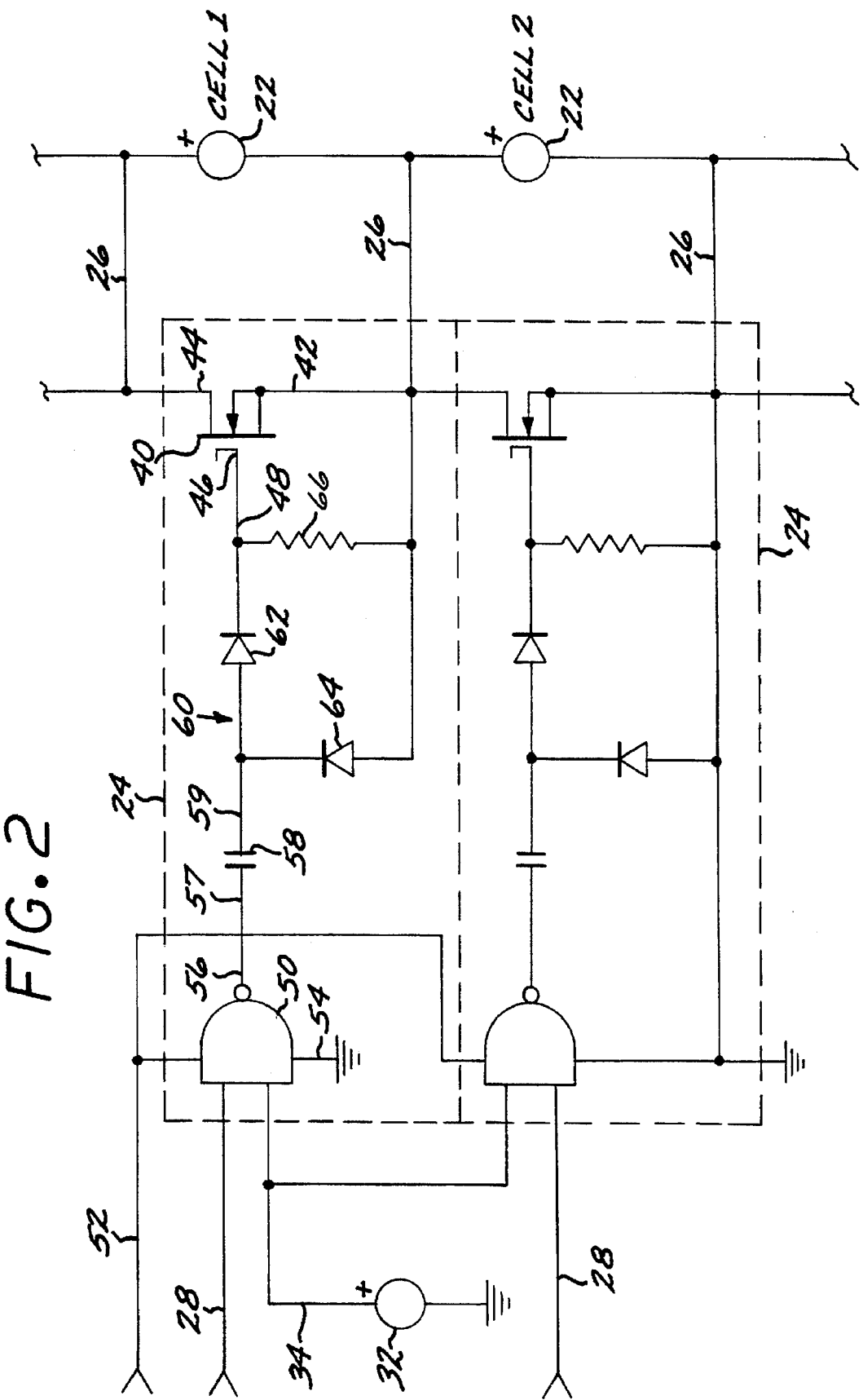
FIG. 2 is a schematic circuit diagram of a preferred bypass circuitry approach.

FIG. 2 depicts the preferred form of the cell bypass circuit 24 in more detail for two of the bypass circuits of FIG. 1, together with their interrelationship with the other battery system elements shown in FIG. 1. The bypass circuit 24 includes a metal-oxide-semiconductor field effect transistor MOSFET) 40. The MOSFET 40 includes a source 42 interconnected to one side of the bypass interconnection 26 (the − side of the cell 22 in the figure) and a drain 44 interconnected to the other side of the bypass interconnection 26 (the + side of the cell 22 in the figure). The MOSFET 40 further has a gate 46 which is selectively activated in the manner to be discussed. Application of a gate activation signal 48 to the gate 46 closes the circuit path between source 42 and drain 44, completing the bypass of the cell 22 through the bypass interconnection 26 and the MOSFET 40.

The use of a MOSFET as the basic current-carrying switch in the bypass circuit 24 has important advantages. MOSFETs having a large current-carrying capability and a small current-path resistance are known in the art, and are available commercially from Motorola, for example. Such MOSFETs are structurally simple, reliable solid-state devices, and are resistant to damage from vibration and other external effects such as those experienced upon spacecraft launch. A typical power MOSFET capable of carrying a current of 30 amperes weighs less than 1.5 grams. The resistance of the current-carrying channel of such MOSFETs is typically very small, on the order of 0.007 ohms. The voltage drop across such a MOSFET during bypass operation of a 20 ampere current is only 0.14 volts with an power dissipation of 2.8 watts, acceptably small values for most applications. If that value is too high for a specific application, additional MOSFETs can be arranged in parallel with that illustrated, within the bypass circuit 24. MOSFETs have disadvantages for some other applications because of relatively slow turn-on times and power dissipation during turn-on. Such slow operational speed is not a disadvantage for the present application, and in fact is an advantage because the MOSFET is not likely to activate unintentionally due to a transient signal.

The gate activation signal 48 is preferably produced by the circuit elements illustrated in FIG. 2. The AC output signal 34 and the bypass selection signal 28 are supplied to an AND gate 50. Power for the operation of the AND gate 50 is provided from a DC source, such as a 15 volt source, through a power line 52. The AND gate 50 is grounded, numeral 54. The AND gate 50 has an AND gate output signal 56 which is the AC output signal 34 when the bypass selection signal 28 is active.

The AND gate output signal 56 is provided to a first electrode or input side 57 of a capacitor 58. The capacitor 58 effective passes the high-frequency AC signal through. The capacitor 58 also isolates the AND gate 50 and other elements found on the AND-gate side of the capacitor from DC voltage levels found on the cell-side of the capacitor. The use of the capacitor has the advantage that it eliminates the need for a transformer or other heavy device, an important consideration for systems to be launched into earth orbit.

A second electrode or output side 59 of the capacitor 58 communicates with a cascade voltage doubling circuit 60. Such a circuit 60 is known, but not, to the inventor's knowledge, for applications like the present one. See, for example, Motorola Silicon Rectifier Data Manual, Series A, 1980.

The cascade voltage doubling circuit 60 includes two legs. A first leg includes a first diode 62 having its anode in communication with the output side 59 of the capacitor 58, and its cathode in communication with the gate activation signal 48 and gate 46. A second leg includes a second diode 64 having its cathode in communication with the output side 59 of the capacitor 58 and its anode in communication with the MOSFET source 42. The second leg further includes a first resistor 66 communicating between the anode of the second diode 64 and the gate activation signal 48 and gate 46. The MOSFET 40 has an internal capacitance between its gate 46 and its source 42, so that the resistor 66 and MOSFET 40 act in the manner of a resistance and capacitance in parallel. If the capacitance of the MOSFET 40 is insufficient, an additional capacitor can be added in parallel with the first resistor 66.

In this circuit 60, the capacitor 58 is charged through the diode 64 in the negative half-cycle of the AC signal. In the positive half-cycle, the capacitor 58 in series with the input AC voltage charges the MOSFET capacitance to a voltage of twice the applied half-wave voltage (or, equivalently, the peak-to-peak voltage of the AC signal). In a typical spacecraft power supply, the peak-to-peak voltage available from a low-power AC power source 32 is about 15 volts. The resulting 15 volt signal applied to the gate 46 is sufficient to maintain the MOSFET gate fully active.

The cascade voltage doubling circuit 60 and associated capacitance of the MOSFET 40 serve to supply a rectified, filtered gate activation signal 48 to the gate 46 of the MOSFET 40, when the gate selection signal 28 is active. The resistor 66 ensures that the gate activation signal 48 is held at 0 volts when the gate selection signal 28 is not active, or to return the signal 48 to 0 volts when the gate selection signal 28 is deactivated (to disable the bypass) after previously being active. The AC signal return is provided by the internal capacitance of the cell 22, which is typically large.

Even where many cells 22 are in series, the return path is still of low impedance. However, if the cell impedance were found to be too high for a specific case, a small shunt capacitor could be placed from the negative terminal of each cell to ground to provide a low-impedance AC return path.

The approach of the invention has been practiced with a bypass circuit 24. In this case, the capacitance of the capacitor 58 was 0.01 microfarad, the resistance of the resistor 66 was 560 kilohms, the diodes 62 and 64 were 1N4148 diodes, and the MOSFET 40 was a Motorola MTP75N05. The cell 22 was simulated by a 1-ampere constant current source. The following Table 1 summarizes the results. In this table, the Input Waveform is the waveform of the AC output signal 34, Frequency is its frequency, and Peak-to-Peak Voltage is its effective DC voltage. The Output Voltage is the output voltage across the MOSFET which has been turned on.

TABLE 1

| Input Waveform | Frequency (KHz) | Peak-toPeak Voltage(V) | Output Voltage(Mv) |
| --- | --- | --- | --- |
| Square | 5 | 7 | 9.41 |
| Square | 5 | 10 | 7.10 |
| Square | 5 | 12 | 6.44 |
| Square | 5 | 16 | 5.96 |
| Square | 10 | 12 | 6.43 |
| Square | 10 | 16 | 5.96 |
| Sine | 5 | 6 | 14.51 |
| Sine | 5 | 8 | 7.89 |
| Sine | 5 | 10 | 6.91 |
| Sine | 10 | 10 | 6.71 |
| Sine | 20 | 10 | 6.69 |

The use of a square-wave input is preferred, as it is the most effective, achieved a resistance of 0.006 ohms with the MOSFET under test, and is the easiest waveform to generate digitally. The square wave is easiest to filter so that a constant DC voltage is achieved, yielding the lowest "on state" resistance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multicell battery system with individually controllable cell bypasses, comprising:
   at least two battery cells;
   a single AC power source having an AC output; and
   means for selectively accomplishing a cell bypass of each of the battery cells, the means for accomplishing including means for selectively bypassing a single battery cell, the means for selectively bypassing a single battery cell including
   a metal-oxide-semiconductor field effect transistor (MOSFET) having a source, a drain, and a gate,
   a first electrical interconnection from the MOSFET source to a first side of the battery cell,
   a second electrical interconnection from the MOSFET drain to a second side of the battery cell, and
   means for selectively activating the MOSFET gate using the AC output and for maintaining the MOSFET gate active.

2. The battery system of claim 1, wherein the at least two battery cells are connected in series.

3. The battery system of claim 1, wherein the AC power source comprises a square-wave source.

4. The battery system of claim 1, wherein the means for selectively activating includes
   an AND gate having as one input the AC output, and as a second input a selection signal, and having as an AND gate output a control signal in communication with the MOSFET gate.

5. The battery system of claim 4, further including
   a capacitor between the AND gate and the MOSFET gate.

6. The battery system of claim 5, further including
   a cascade voltage doubling circuit between the capacitor and the MOSFET gate.

7. The battery system of claim 1, further including means for selectively bypassing a single battery cell for each of the battery cells, each of the means for selectively bypassing a single battery cell having the structure recited in claim 1.

8. A multicell battery system with individually controllable cell bypasses, comprising:
   a plurality of battery cells;
   a single AC power source having an AC output signal; and
   a selective cell bypass of each of the battery cells, each cell bypass comprising
   a metal-oxide-semiconductor field effect transistor (MOSFET) having a source, a drain, and a gate,
   a first electrical interconnection from the MOSFET source to a first side of the battery cell,
   a second electrical interconnection from the MOSFET drain to a second side of the battery cell, and
   an activation circuit connected to the MOSFET gate, the activation circuit comprising
   an AND gate having as one input the AC output signal, and as a second input a selection signal, and having an AND gate output signal,
   a capacitor having a first electrode in communication with the AND gate output signal and a second electrode, and
   a cascade voltage doubling circuit having an input in communication with the second electrode of the capacitor and an output in communication with the MOSFET gate.

9. The battery system of claim 8, wherein the cascade voltage doubling circuit comprises:
   a first leg comprising a first diode having a first diode anode in communication with the input and a first diode cathode in communication with the MOSFET gate; and
   a second leg comprising
   a second diode having a second diode cathode in communication with the input and a second diode anode in communication with the MOSFET source, and
   a resistor having a first resistor end in communication with the second diode anode and a second resistor end in communication with the MOSFET gate.

10. The battery system of claim 8, wherein the at least two battery cells are connected in series.

11. The battery system of claim 8, wherein the AC power source comprises a square-wave source.

* * * * *